United States Patent
Ahmad et al.

(10) Patent No.: US 12,302,097 B2
(45) Date of Patent: *May 13, 2025

(54) METHODS, APPARATUS AND SYSTEMS USING VEHICLE-TO-EVERYTHING (V2X) ENHANCEMENTS TO SUPPORT VEHICLE-TO-PEDESTRIAN (V2P) COMMUNICATION

(71) Applicant: InterDigital Patent Holdings, Inc., Wilmington, DE (US)

(72) Inventors: Saad Ahmad, Montreal (CA); Samir Ferdi, Kirkland (CA); Michelle Perras, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/782,793

(22) Filed: Jul. 24, 2024

(65) Prior Publication Data

US 2024/0381078 A1 Nov. 14, 2024

Related U.S. Application Data

(63) Continuation of application No. 17/799,136, filed as application No. PCT/US2021/017766 on Feb. 12, 2021.

(Continued)

(51) Int. Cl.
*H04W 12/047* (2021.01)
*H04W 76/14* (2018.01)
(Continued)

(52) U.S. Cl.
CPC ......... *H04W 12/047* (2021.01); *H04W 76/14* (2018.02); *H04W 76/30* (2018.02); *H04W 92/18* (2013.01)

(58) Field of Classification Search
CPC ... H04W 12/047; H04W 76/14; H04W 76/30; H04W 92/18
See application file for complete search history.

(56) References Cited

U.S. PATENT DOCUMENTS

| | | | |
|---|---|---|---|
| 2011/0035503 A1 | 2/2011 | Zaid et al. | |
| 2011/0035584 A1* | 2/2011 | Meyerstein | H04W 12/043 713/168 |

(Continued)

FOREIGN PATENT DOCUMENTS

| | | |
|---|---|---|
| CN | 104640104 A | 5/2015 |
| CN | 110298939 B | 3/2023 |

OTHER PUBLICATIONS

3rd Generation Partnership Project; Technical Specification Group Services and System Aspects; Architecture enhancements for 5G System (5GS) to support Vehicle-to-Everything (V2X) services (Release 16); 3GPP TS 23.287 V16.2.0 (Mar. 2020) / Mar. 27, 2020.

(Continued)

*Primary Examiner* — Deepa Belur
(74) *Attorney, Agent, or Firm* — Volpe Koenig

(57) ABSTRACT

V2X Enhancements to support V2P communication are disclosed. In particular, Vehicle to Pedestrian Communications are provided. Methods and apparatus for direct link with a peer WTRU using a first key identifier of a root key are provided. In an embodiment, a method includes sending, by the initiating WTRU to the peer WTRU, a release request message to release the direct link with the peer WTRU, the release request message including information indicating first security information associated with a second key identifier of the root key. The method further includes receiving a response to the release request message including second security information associated with the second key identifier of the root key. The method also includes determining the second key identifier of the root key using (Continued)

the first security information and the second security information; and sending a message including information indicating the second key identifier of the root key.

16 Claims, 11 Drawing Sheets

Related U.S. Application Data

(60) Provisional application No. 63/008,253, filed on Apr. 10, 2020, provisional application No. 62/976,174, filed on Feb. 13, 2020.

(51) Int. Cl.
*H04W 76/30* (2018.01)
*H04W 92/18* (2009.01)

(56) References Cited

U.S. PATENT DOCUMENTS

| | | | |
|---|---|---|---|
| 2014/0032905 A1 | 1/2014 | Long et al. | |
| 2014/0351479 A1 | 11/2014 | Lee et al. | |
| 2016/0191471 A1 | 6/2016 | Ryoo et al. | |
| 2018/0130274 A1 | 5/2018 | Hernandez et al. | |
| 2018/0152986 A1* | 5/2018 | Jung | H04W 76/27 |
| 2018/0165344 A1 | 6/2018 | Williams et al. | |
| 2019/0394816 A1* | 12/2019 | Kim | H04W 76/10 |
| 2020/0229007 A1* | 7/2020 | Jung | H04W 76/10 |
| 2021/0067495 A1 | 3/2021 | Yuting et al. | |
| 2022/0007445 A1* | 1/2022 | Pan | H04W 76/15 |
| 2022/0103997 A1 | 3/2022 | Kang et al. | |
| 2022/0132307 A1* | 4/2022 | Perras | H04W 4/40 |
| 2023/0071287 A1* | 3/2023 | Ahmad | H04L 63/123 |
| 2024/0214848 A1* | 6/2024 | Kang | H04W 40/22 |
| 2024/0357467 A1* | 10/2024 | Perras | H04W 12/03 |
| 2025/0031258 A1* | 1/2025 | Pan | H04W 76/14 |

OTHER PUBLICATIONS

Anonymous, "Security aspects of 3GPP support for advanced Vehicle-to-Everything (V2X) services", 3rd Generation Partnership Project (3GPP), Technical Specification Group Services and System Aspects, Document: 3GPP TS 33.536 V1.0.0, Release 16, Mar. 2020, 22 pages.

"3rd Generation Partnership Project (3GPP); Technical Specification Group Services and System Aspects; Proximity-based services (ProSe); Stage 2 (Release 15)", 3GPP TS 23.303 V15.1.0, Jun. 2018, 130 pages.

Anonymous, "Vehicle-to-Everything (V2X) services in 5G System (5GS)", 3rd Generation Partnership Project (3GPP), Technical Specification Group Services and System Aspects, Document: 3GPP TS TS 24.587 V16.0.0, Release 16, Mar. 2020, 63 pages.

Anonymous, "Enhancement of 3GPP support for V2X scenarios, Stage 1", 3rd Generation Partnership Project (3GPP), Technical Specification Group Services and System Aspects, Document: 3GPP TS 22.186 v15.0.0, Release 15, Mar. 2017, 16 pages.

Anonymous, "New SID: Study on architecture enhancements for 3GPP support of advanced V2X services—Phase 2", 3rd Generation Partnership Project (3GPP), Document: SP-190631, 3GPP SA2 Meeting #134, Sapporo, Japan, Jun. 24, 2019, 4 pages.

"3rd Generation Partnership Project; Technical Specification Group Services and System Aspects; Study on Security Aspects of 3GPP support for Advanced V2X Services" (Release 16), Document: 3GPP TR 33.836 V0.4.0, Oct. 2019, 46 pages.

Huawei et al., Evaluation of Solution #15 in TR33.836, 3GPP TSG-SA WG3 Meeting #7, S3-194096, Reno, Nevada (Nov. 18-22, 2019).

Third Generation Partnership Project, Technical Specification Group Core Network and Terminals; Proximity-services (ProSe) User Equipment (UE) to ProSe function protocol aspects; Stage 3 (Release 14), 3GPP TS 24.334 V14.1.0 (Sep. 2018).

* cited by examiner

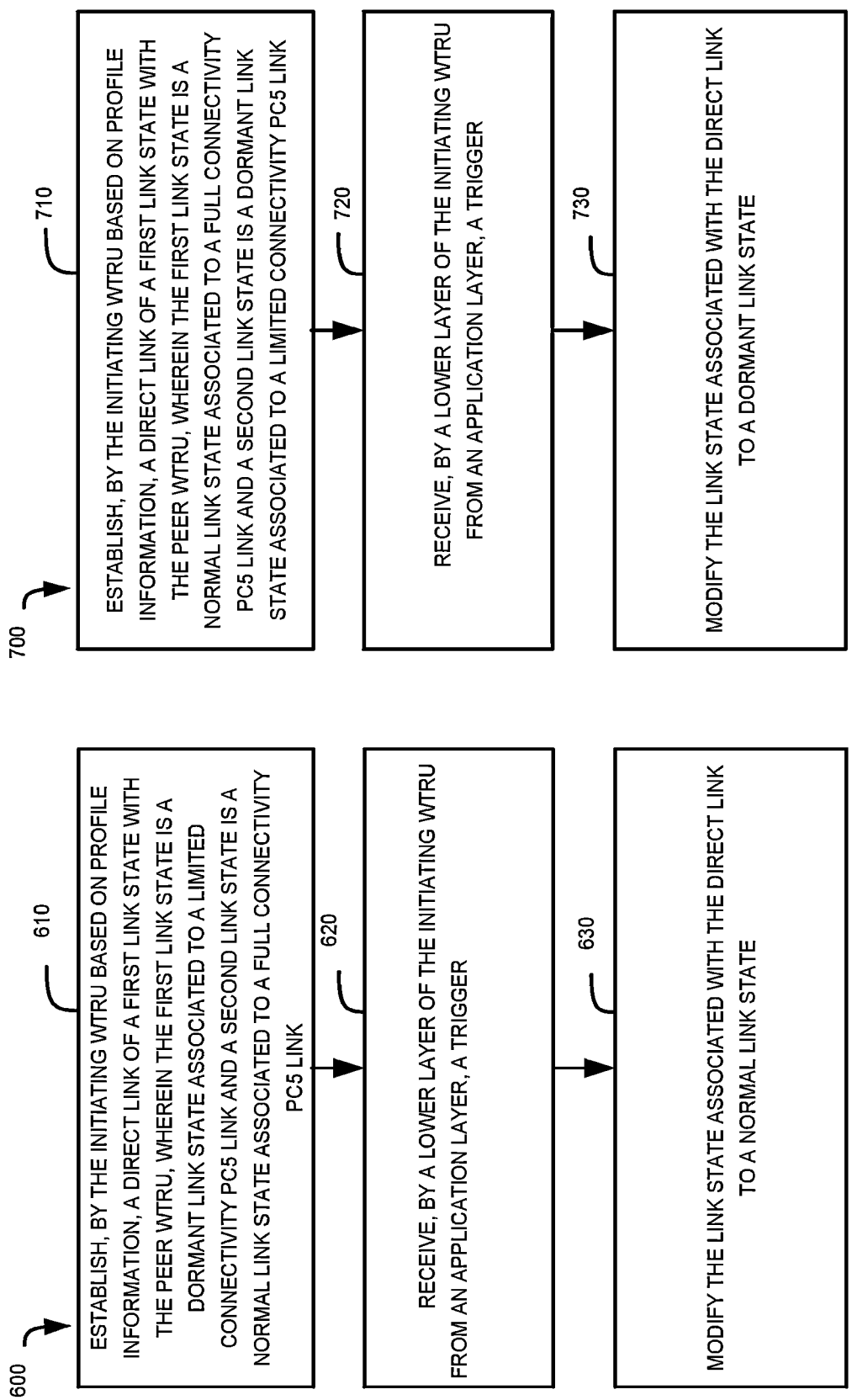

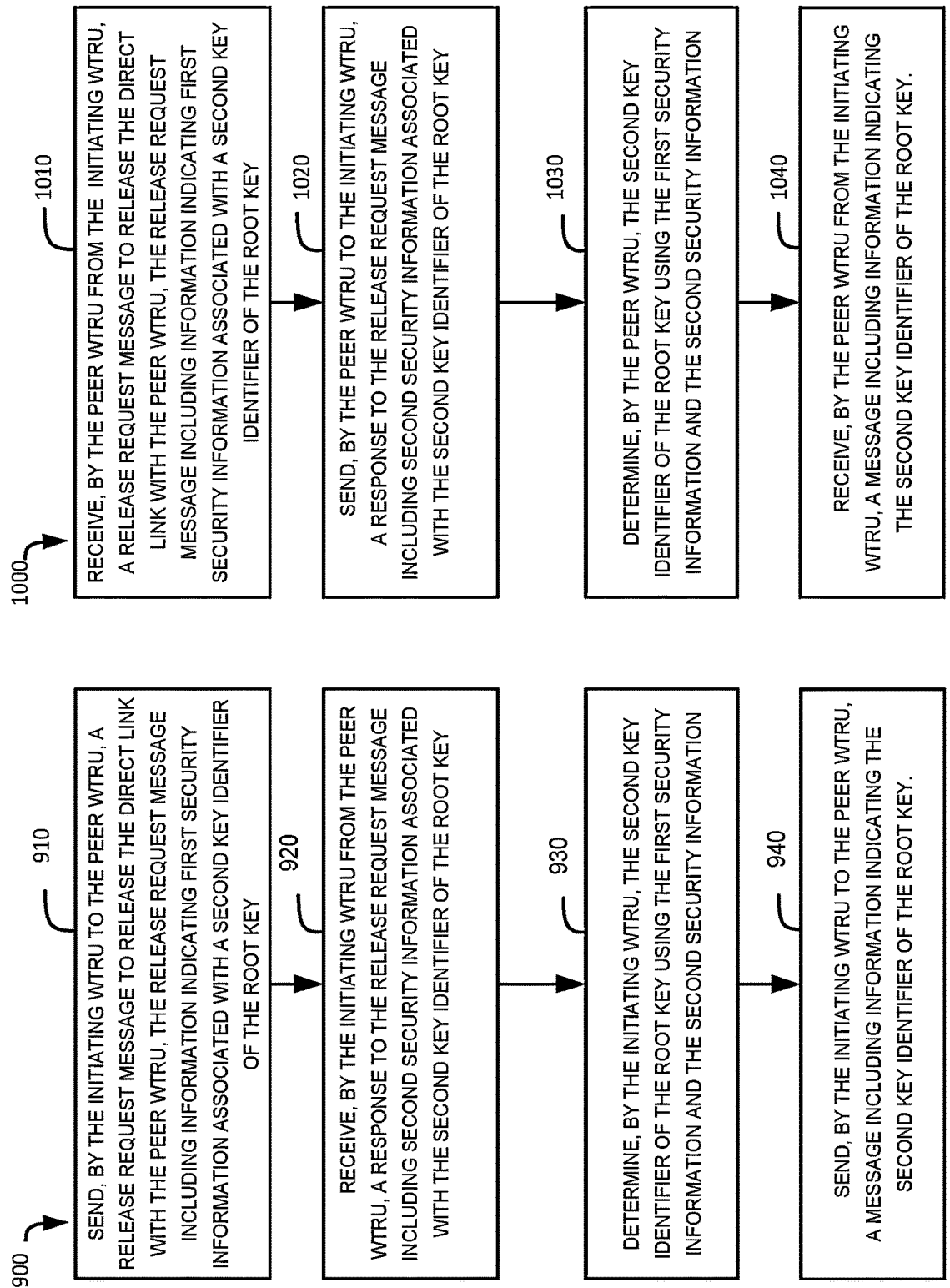

_
METHODS, APPARATUS AND SYSTEMS USING VEHICLE-TO-EVERYTHING (V2X) ENHANCEMENTS TO SUPPORT VEHICLE-TO-PEDESTRIAN (V2P) COMMUNICATION

CROSS-REFERENCE TO RELATED APPLICATIONS

This application is a continuation of U.S. Non-Provisional application Ser. No. 17/799,136, filed Aug. 11, 2022, which is a U.S. National Stage Application under 35 U.S.C. 371 of International Patent Application No. PCT/US2021/017766, filed Feb. 12, 2021, which claims the benefit of priority to U.S. Provisional Patent Application Ser. No. 62/976,174, filed Feb. 13, 2020, and U.S. Provisional Patent Application Ser. No. 63/008,253, filed Apr. 10, 2020, the contents of each of which is incorporated herein by reference.

FIELD

Embodiments disclosed herein generally relate to wireless communications and, for example to methods, apparatus and systems using V2X enhancements to support V2P communication.

BACKGROUND

V2X communications architecture has been developed for wireless communication systems, including those which use an evolved packet core (EPC). V2X communications may include one or more of vehicle-to-vehicle (V2V) communications, V2P communications, vehicle-to-infrastructure (V2I) communications and vehicle-to-network (V2N) communications.

New Radio (NR) V2X may supports two modes of operations, Mode 1 and Mode 2. Mode 1 is based on Long Term Evolution (LTE) V2X Mode 3 operation. For example, the network may schedule a sidelink (SL) resource via downlink (DL) downlink control information (DCI) signaling and a wireless transmit/receive unit (WTRU) may apply the received resource reservation for SL transmission. Mode 2 may use LTE Mode 4 as a baseline for semi-persistent scheduling. In Mode 4, the WTRU may autonomously select and reserve the resources from a configured resource pool. In an example, the configured resource pool may be a preconfigured resource pool. An autonomous resource reservation may be based on WTRU sensing to identify available candidate resources.

SUMMARY

V2X Enhancements to support V2P communication are disclosed. In particular, Vehicle to Pedestrian Communications and Security are provided. Methods and apparatus for operation by an initiating wireless transmit/receive unit (WTRU) for direct link with a peer WTRU using a first key identifier of a root key are provided. In one embodiment, a method includes sending, by the initiating WTRU to the peer WTRU, a release request message to release the direct link with the peer WTRU, the release request message including information indicating first security information associated with a second key identifier of the root key. The method further includes receiving, receiving, by the initiating WTRU from the peer WTRU, a response to the release request message including second security information associated with the second key identifier of the root key. The method also includes determining, by the initiating WTRU, the second key identifier of the root key using the first security information and the second security information; and sending, by the initiating WTRU to the peer WTRU, a message including information indicating the second key identifier of the root key.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 6 is a flowchart illustrating a further representative method implemented by an initiating wireless WTRU for direct link with a peer WTRU;

FIG. 7 a flowchart illustrating another representative method implemented by an initiating wireless WTRU for direct link with a peer WTRU;

FIG. 9 is a flowchart illustrating a representative method implemented by an initiating wireless WTRU for direct link with a peer WTRU using a first key identifier of a root key; and FIG. 10 is a flowchart illustrating a further representative method implemented by an initiating wireless WTRU for direct link with a peer WTRU using a first key identifier of a root key.

DETAILED DESCRIPTION

Figure 1A:
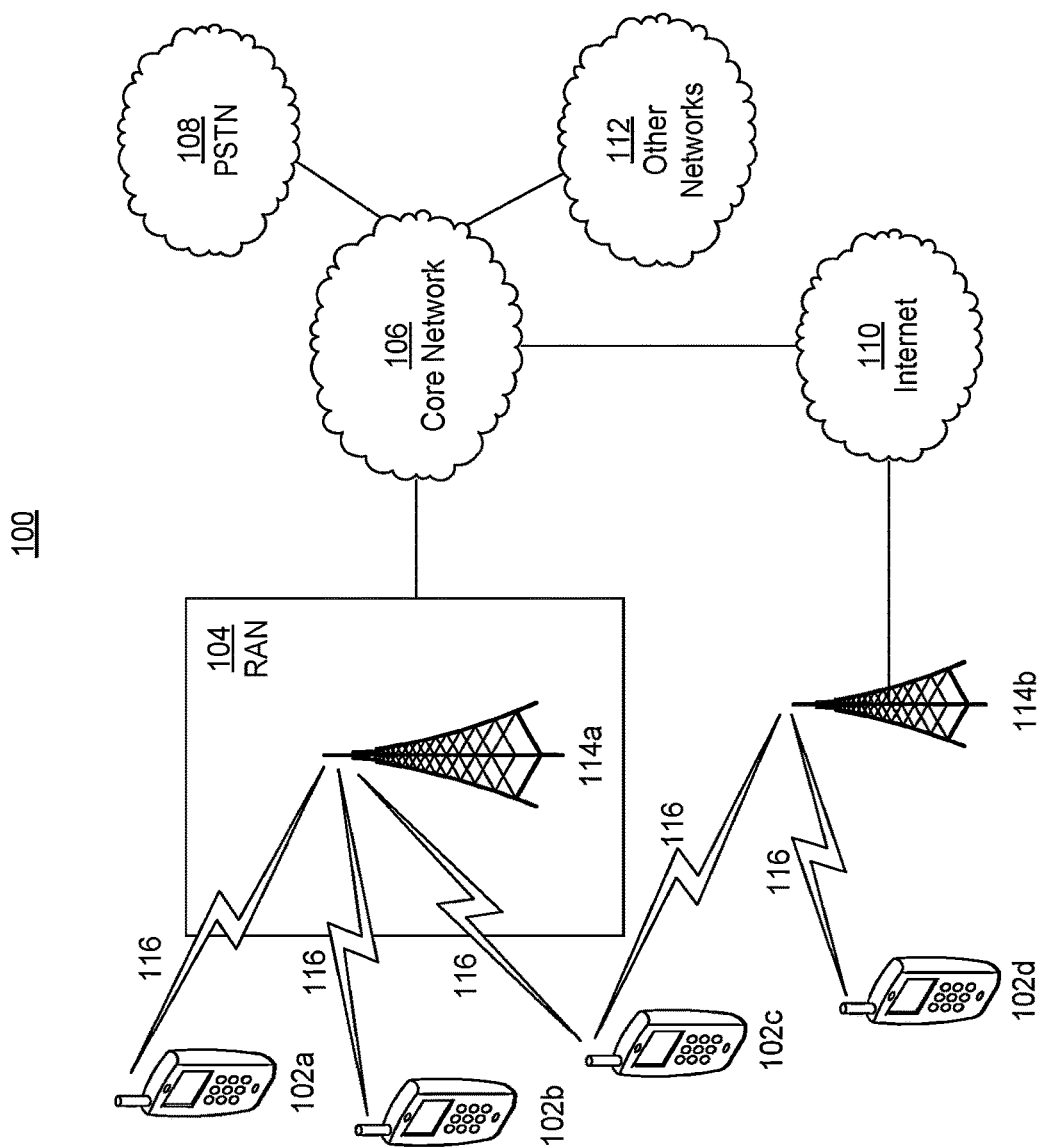
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
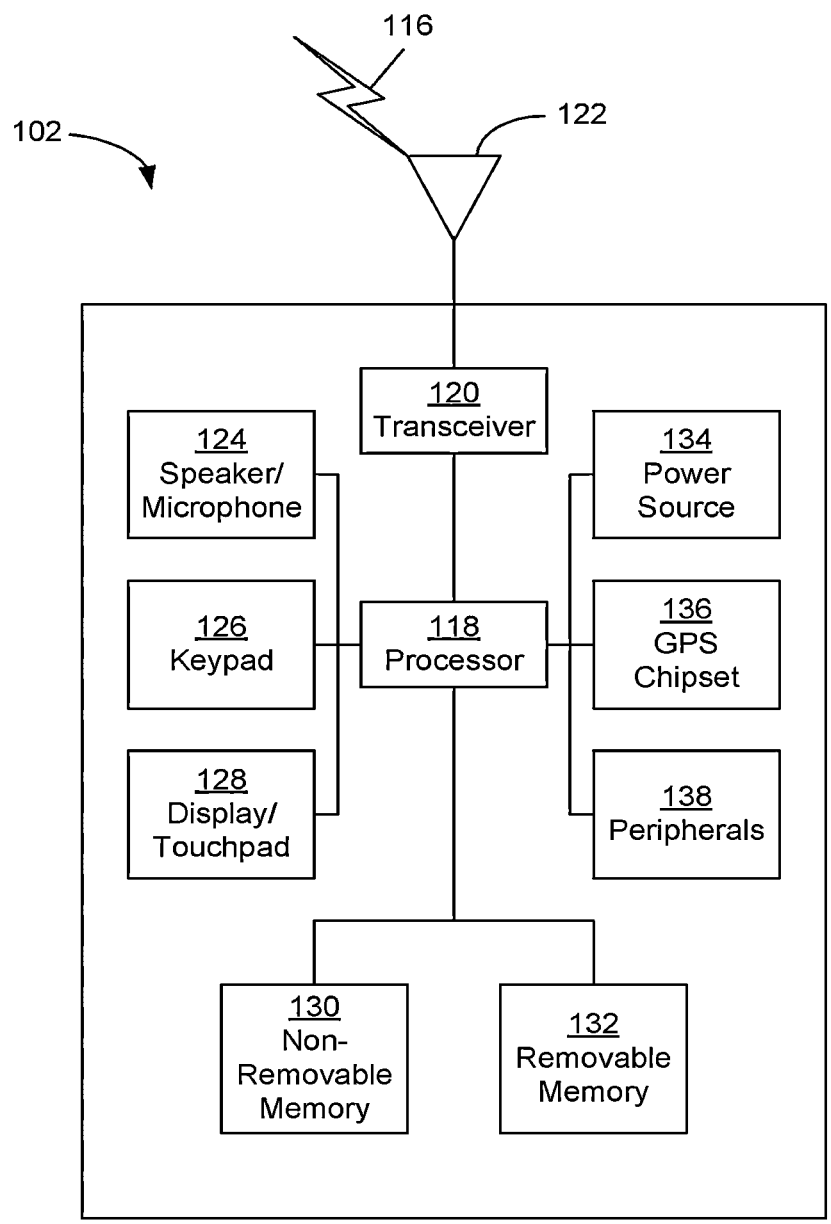
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
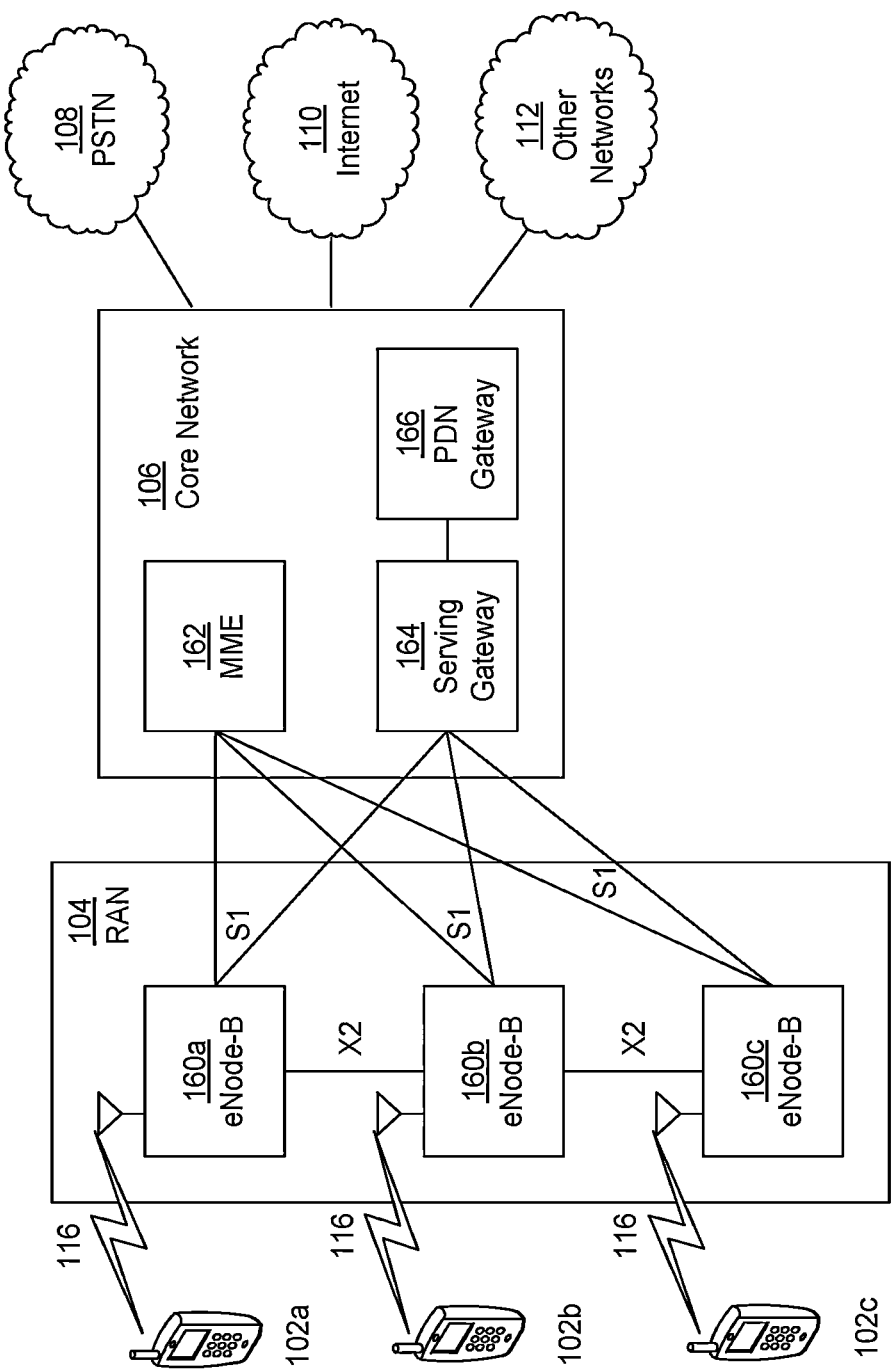
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHZ operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
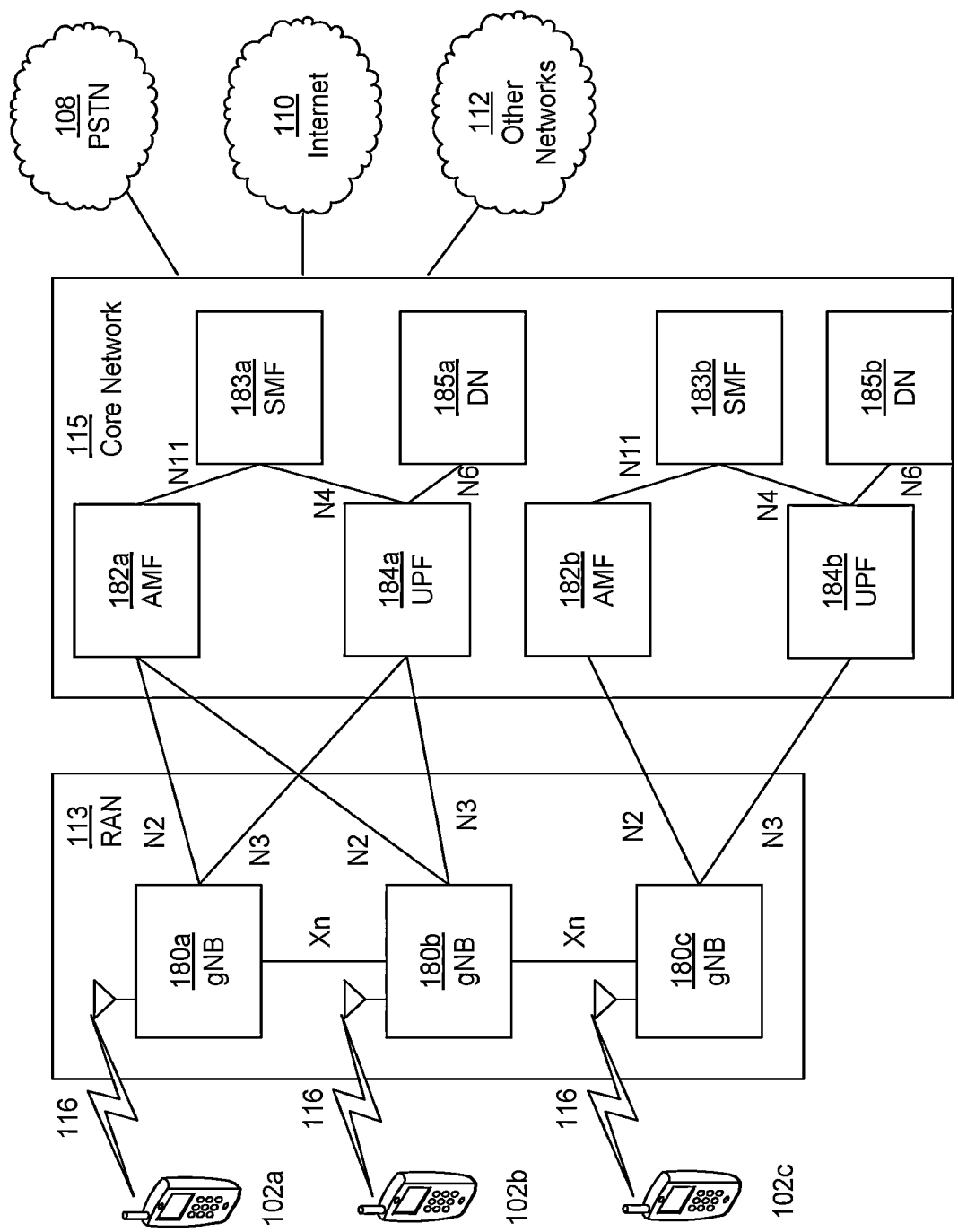
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As used herein, the term WTRU is further used as a generic term to identify a device in which one or multiple V2X Application(s) is/are running. V2X Application Server (V2X AS) may be located in the network and may interface with V2X applications installed on the WTRUs. V2X Control Function (CF) may handle V2X devices' authorization and provisioning. This may, for example, include V2X policy and/or parameters configuration towards the WTRU. V2XCF functionality may be handled at the PCF. V2X WTRU-to-WTRU communication may be based on two modes of operation: over Uu reference point and over PC5 reference point.

The V2X communication over PC5 reference point may be a type of ProSe Communication. One-to-one ProSe direct communication may be realized by establishing a secure layer-2 link over PC5 between two WTRUs, often referred to as a unicast communication (e.g., the communication may involve 2 peers).

Figure 2:
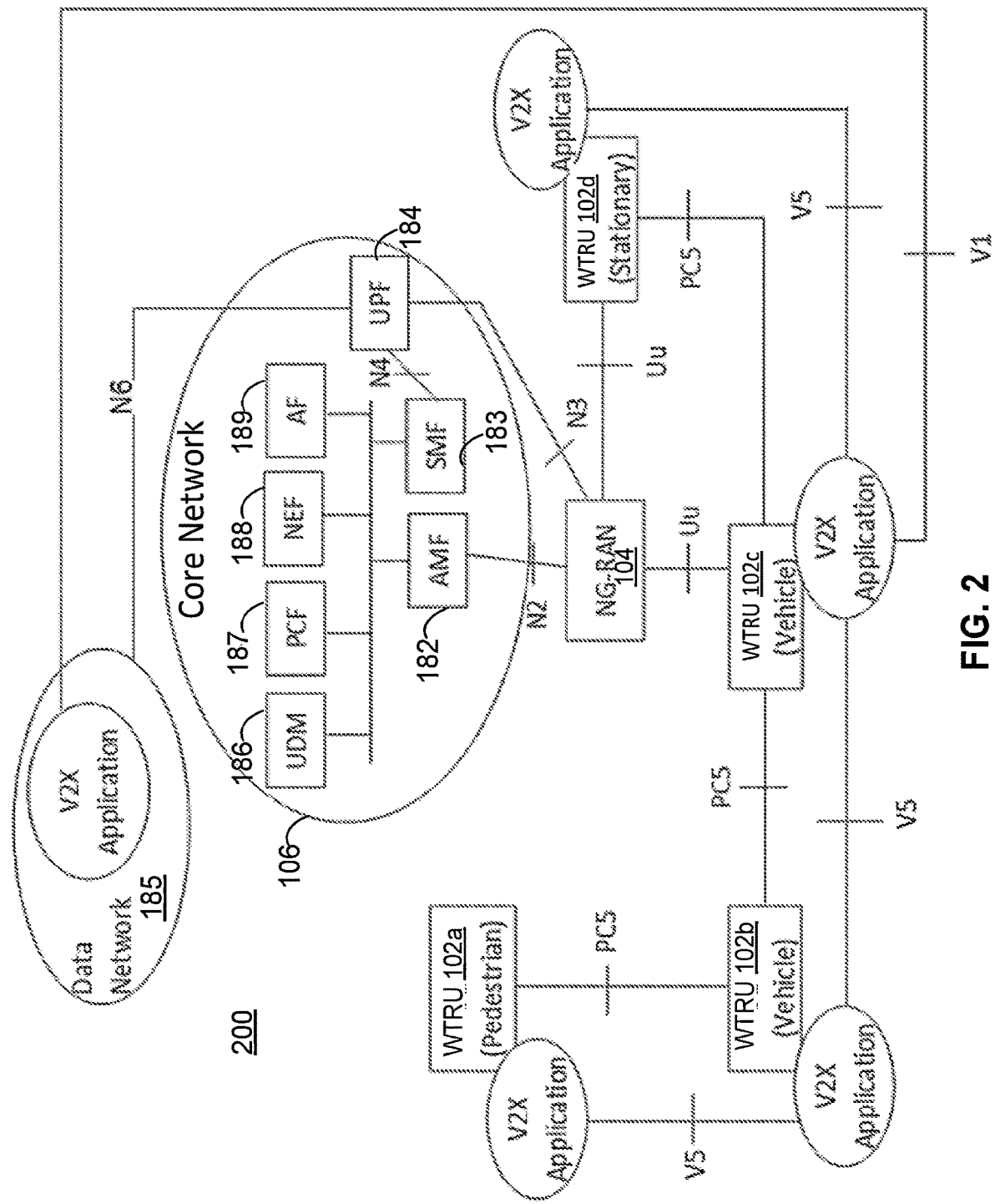
FIG. 2 illustrates a non-roaming 5G System architecture for PC5 and Uu based V2X communication.

FIG. 2 illustrates a Non-roaming 5G System architecture for PC5 and Uu based V2X communication. As seen in FIG. 2, some examples of V2X WTRU 102 may be a Vehicle WTRU (WTRU 102b and WTRU 102c) or Pedestrian WTRU (WTRU 102a). The V2X communication may also happen between two Pedestrian WTRUs. The V2X communication may also happen between mobile WTRUs 102a, 102b and/or 102c and fixed/stationary WTRUs 102c (e.g., an Road Side Unit (RSU) or other fixed device). The communication between WTRU 102b or 102c (Vehicle) and WTRU 102a (Pedestrian) may be referred to as V2P communication whereas the communication between WTRU 102b (Vehicle) and WTRU 102c (Vehicle) may be called V2V communications. As depicted in FIG. 2, both V2V and V2P communications may happen over PC5 interface and the characteristics, such as message frequency, power, etc., of V2V communication may be different from V2P type communication.

Referring to FIG. 2, the V2X communication network 200 may include a DN 185 executing/running one or more V2X applications, a first vehicle (e.g., a vehicle WTRU 102b) executing/running one or more V2X applications, a second vehicle (e.g., a vehicle WTRU 102c) executing/running one or more V2X applications, a pedestrian (e.g., a pedestrian/V2P WTRU 102a) executing/running one or more V2X applications, a stationary/fixed device (e.g., a stationary WTRU 102d) executing/running one or more V2X applications, a NG-RAN 104 and a core network (CN) 106. The CN 106 may include an AMF 182, an SMF 183, a UPF 184, a DN 185, a unified data management (UDM) 186 that may be paired with a user data repository (UDR, not shown), a policy and control function (PCF) 187, a network exposure function (NEF) 188, and/or an application function (AF) 189. The WTRUs (e.g., Vehicle WTRU 102b, Vehicle WTRU 102c, Pedestrian WTRU 102a and/or Stationary WTRU 102d) may communicate using a PC5 interface (e.g., PC5 communications). The V2X applications executing on the WTRUs (e.g., Vehicle WTRU 102b, Vehicle WTRU 102c, Pedestrian WTRU 102a and/or Stationary WTRU 102d) may communicate using a V5 interface. Vehicle WTRU 102b and Stationary WTRU 102d may communicate with the NG-RAN 104 using a Uu interface. The NG-RAN 104 may communicate with the AMF 182 of the CN 106 using a N2 interface and with the UPF 184 of the CN 106 using a N3 interface. The DN 185 may be internal to the CN 106 or interface with the CN 104 using an N6 interface. The UPF 184 and the SMF may communicate using a N4 interface.

The V2P WTRU 102a supporting V2P applications transmits messages including or containing V2P application information. The V2P application information may be transmitted either by a WTRU supporting V2X application in a vehicle, such as a warning to a pedestrian, or by a WTRU supporting V2X application associated with a vulnerable road user, such as a warning to a vehicle. 3GPP transport of messages including/containing V2P application information may include the transport between WTRUs 102 directly and/or, for example, due to the limited direct communication range, the transport between WTRUs via infrastructure supporting V2X communication, e.g., Road Side Unit (RSU), application server, etc. As described herein and based on the architecture in FIG. 2, the vehicle type of WTRU 102b/102c and pedestrian type of WTRU 102a may be supported by V2X. Other functionality specific for the pedestrian type of WTRUs 102a carried by pedestrian users, cyclists, etc. may also be supported by V2X. Special resource selection mechanism (i.e., partial sensing or random selection) for the pedestrian type of WTRU 102a may be utilized in PC5 communications. Generally, there is no optimization for the pedestrian type of WTRUs, 102a which has power and computation limitations compared to Vehicle WTRUs 102b/102c. There is a desire to have support of V2X use for Vulnerable Road Users (VRU), and therefore provide enhancement for related aspects, e.g., power saving, etc.

Privacy for PC5 unicast link identities may also be included. A Link Identifier Update procedure may provide privacy for the identities used in the PC5 unicast link. New identifiers may be exchanged using a three-way exchange of protected messages. The new identifiers may be subsequently used for that connection. The identifiers exchanged include new L2 IDs for the peer WTRUs 102 and a new KD-session ID. The peer WTRUs 102 may exchange periodically fresh identifiers to prevent linkability and trackability attacks since these identifiers are transmitted as cleartext with each transmission (L2 frame, PDCP packet).

KD-session ID identifies the security context that is being used by the peer WTRUs 102 to protect the communications over the PC5 unicast link. The session key KD-session may be derived from a root key KD that is established by the peer WTRUs 102 during their mutual authentication. KD ID identifies the root key KD and may be transmitted in the clear during link establishment in a Direct Communication Request (DCR) message, for example when a WTRU 102a reestablishes a connection with a peer WTRU 102b that was already authenticated.

As set forth herein, V2X procedures described are for the most part defined for V2V communication. These procedures may be applicable to V2P communication and may be optimized for pedestrian WTRU's due to different characteristics of such devices. A WTRU 102a supporting V2P applications used by pedestrian might, for example, have lower battery capacity, limited radio range, e.g., due to antenna design, and therefore may not be able to send messages with the same periodicity as WTRUs supporting V2V application, and/or receive messages. A WTRU 102 may be used for safety purposes, for example, to exchange safety message and information, such as about the environment, for example, with other WTRUs 102b, 102c, 102d (e.g., vehicles, RSUs, etc.). For vehicles or fixed RSUs, power may not be an issue, however, for smartphones, the power may be limited and may need to be managed efficiently. The present disclosure enhances 5G System to support the uses, requirements and/or properties of the V2P communication.

Enhanced privacy for PC5 unicast communications may be provided. The Link Identifier Update procedure may enable the peer WTRUs to change periodically L2 ID and/or KD-session ID to preserve the privacy of these identities throughout the lifetime of a given connection. Unlike the above identities, the root key KD with its identifier KD ID may be reused across multiple subsequent connections (e.g., when the peer WTRUs disconnect and subsequently reconnect). An attacker may be able to link a given connection and subsequent reconnection(s) between these peer WTRUs 102 using the KD ID that is sent in the clear in the DCR message.

Establishing the KD ID during the Link Identifier Update procedure may be insufficient to mitigate the threat completely as the peer WTRUs 102 may disconnect and then reconnect before any Link Identifier Update procedure completion. Using the Link Identifier Update procedure to perform a change of KD ID may introduce unnecessary overhead as performing such a change may be used/required once before re-establishing a new connection between the peer WTRUs 102, since the KD ID may not be sent as cleartext with each transmission as the KD session ID and L2 IDs.

In certain representative embodiments, procedures may be implemented, for example, to enhance the support of V2X operation for pedestrian WTRUs 102a and/or WTRUs 102 for Vulnerable Road Users (e.g., in an efficient manner). A pedestrian user with its smartphone, which may be an example of V2P WTRU 102a, may be involved in V2X communication or possibly safety support. When the WTRU 102 is in a certain location (e.g., inside a building and/or not required to be engaged in V2X communication) certain V2X features of the WTRU 102 may be in a dormant state and/or used sparingly. V2X communication for V2P WTRU 102a or WTRUs 102 supporting V2P application may be enabled by using a "state change trigger" used by the WTRU, for example to efficiently adapt its behavior to the requirements of V2P communication, as already described. The Application client, such as the V2P Application, for example, running on the WTRU has the capability to deduce and/or obtain the WTRU's application characteristics or precise location, e.g., WTRU 102 is located indoors or outdoors, speed, direction, for example. The WTRU 102 may be provisioned with multiple profiles per Application ID. The WTRU 102 may establish a PC5 unicast link indicating its required PC5 Link state. If the link is established with a dormant PC5 state, the WTRU 102 may establish a limited connectivity PC5 link. The limited connectivity PC5 link may include lower QoS, very low frequency of keep alive (e.g., keep alive messages), etc. The WTRU 102 may receive a trigger from the Application layer based on, for example, on WTRU's precise location. The WTRU 102 may adapt its behavior based on its contextual information including location, current state and/or configured profile (e.g., profile information) for the specific Application, e.g., change from dormant state to normal PC5 state (e.g., from limited connectivity PC5 link to full PC5 connectivity link, etc.). The WTRU 102 may inform its peer WTRU 102 about its state modification status by sending a PC5 Link Modification Request with its new state (e.g. transition to a full connectivity (normal) PC5 link).

During registration, the WTRU 102 may send one or more pedestrian capabilities, may receive profiles and/or configuration information. When the V2P WTRU 102a performs the registration procedure with the network, the WTRU 102 may include its capability to perform V2P communication in the registration message. The AMF 182, upon receiving the registration message, may check with the WTRU subscription with the UDM/UDR 186. If the WTRU 2102 is authorized based on the subscription to perform V2P communication, the AMF 182 may further retrieve the configuration parameters from the PCF 187. The V2P configuration parameters are returned to the pedestrian WTRU 102a by the AMF 182 in a registration accept message. The V2P configuration parameters may include one or more of the following: applications or application IDs authorized for V2P communication; profile information that may trigger state change (e.g., the profile/profile information may be based on multiple contextual parameters, e.g.: Location, Elevation, Directional Velocity, Battery level, PC5 Link State; location values may be e.g.: pedestrian outside, pedestrian inside, fast moving; battery level values may be e.g.: Full, Half, Low; and link state may be e.g. Normal, Dormant/limited). By way of example, profiles with Link State per Location/Battery level may include pedestrian outside, battery Full/Half level to normal PC5 connection for V2P; pedestrian outside, battery Low level to Dormant PC5 for V2P; pedestrian inside (office, shopping center), battery level to Dormant PC5 for V2P; fast moving (e.g., in a car), battery Full/Half level to Normal PC5 connection; pedestrian outside to Normal PC5 connection; value of keep alive timer during the dormant PC5 state; value of timer to stay in the dormant PC5 state or the inactivity timer to enter the dormant PC5 state; bit rate e.g., AMBR for the dormant/limited PC5 connection; certificates or keys may be configured in case a PC5 link is established in dormant/limited state; and/or maximum number of PC5 connections when in dormant/limited state.

The pedestrian WTRU 102a may use the received configuration parameters in conjunction with the information received from the application layer. The application layer may determine that the pedestrian WTRU 102a is in indoor or outdoor and/or at a specific location. This information may be passed down to the V2X or PC5 layer. The PC5 layer may trigger (e.g., then trigger) a state change behavior based on the inputs from the application and/or the received configuration parameters.

During the registration procedure, the AMF 182 may inform the RAN (ng-NB) that the pedestrian WTRU 102a is authorized for V2P communication via N2 messaging. The application on the pedestrian WTRU 102a may determine/figure out the location (e.g., that the pedestrian WTRU 102a is indoor or outdoor etc.). The network may decide/determine to change and update the V2P WTRU configuration parameters. The pedestrian WTRU 102a may receive the new/updated parameters any time after registration via a WTRU Configuration procedure.

The WTRU 102 may establish a Unicast PC5 Communication. When the pedestrian WTRU 102a (sometimes referred to as a V2P WTRU) establishes unicast PC5 communication with a peer WTRU (e.g. another pedestrian WTRU 102a, Vehicle WTRU 102b/102c or RSU (e.g., a stationary WTRU 102d, etc.), the V2P WTRU 102a may indicate that the PC5 connection/link is for V2P communication. Such an indication may be in the form of one or more pedestrian capability IEs and/or explicit pedestrian information in the connection type information element and/or application ID of the V2P application. The V2P WTRU 102a may indicate the 'link state' (e.g., 'required link state') (dormant or normal) of the PC5 unicast link and/or may indicate its battery level. The WTRU 102 may send these new information elements in a Direct Communication Request (DCR) message. The unicast link establishment may be completed when the peer WTRU sends a Direct Communication Accept (DCA) message. Based on state information (e.g., the 'required state' information) exchanged during the link establishment procedure, the PC5 link may either be in a dormant state or a normal state. If the link is established in the normal state, the peer WTRU 102 may operation/behave as per the normal PC5 unicast operation.

A WTRU 102 that has a normal unicast link with a peer WTRU 102 may use its peer WTRU's battery level to determine if more PC5 links may be or should be established with other surrounding WTRUs 102. For example, it is expected that the existing PC5 link state may change from normal state to dormant state, if the peer WTRU's battery level is advertised as Medium (e.g., an intermediate level) and many V2P messages (e.g., a threshold number of messages) are exchanged. A WTRU 102 that has a dormant unicast link with a peer WTRU 102 and a Low battery level may establish a minimum number of PC5 links for a specific application, as dictated into the profile/profile information (e.g., set based on rules in accordance with the profile), e.g., to not exceed the maximum number of PC5 links when in dormant/limited state, for example to save power.

Figure 3:
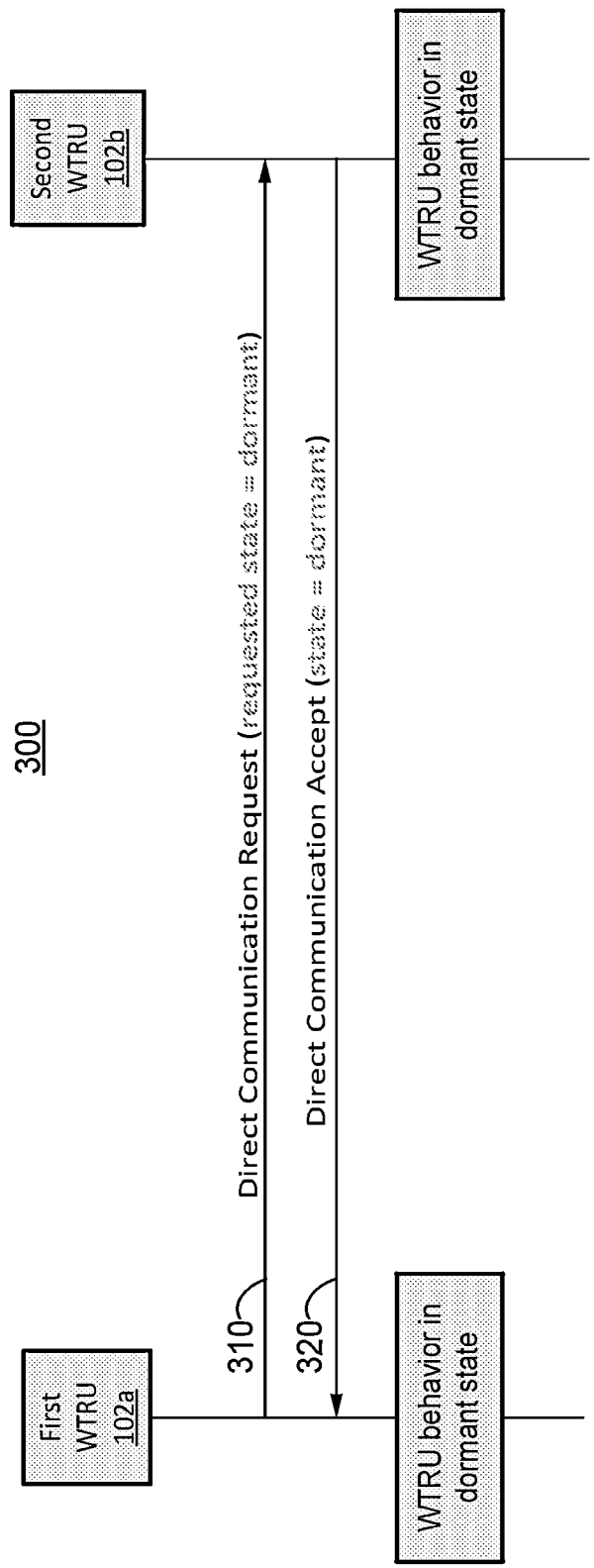
FIG. 3 illustrates an example of WTRU establishing dormant PC5 link as per the procedures described herein.

FIG. 3 is a diagram illustrating an example procedure of WTRU (e.g., WTRU 102a) establishing a dormant PC5 link as per the procedures described herein.

Referring to FIG. 3, the procedure 300 may include, at 310, a WTRU 102a sending a message (e.g., a DCR message or another type of direct message) to a peer WTRU 102b. At 320, the peer WTRU 102b may send a message (e.g., a Direct Communication Accept (DCA) message or another type of direct message) to the WTRU 102a. For example, the message from the WTRU 102a may include information indicating a requested or required state to be a first link state (e.g., a dormant link state or a normal link state) and the message from the WTRU 102b in response may include information indicating an acceptance of the first link state (e.g., the dormant link state or a normal link state).

In certain representative embodiments, the normal PC5 link state may be changed to dormant link state during the PC5 operation. The change of state is further described herein.

Upon establishing the unicast link in the 'dormant' or limited PC5 state, the peer WTRUs may behave differently compared to the 'normal' state in the following manner. The requesting WTRU (e.g., WTRU 102a) may request the PC5 link with default of lowest QoS value (PQI), or the responding WTRU (e.g., WTRU 102b) may respond back with low QoS value. A PC5-S channel may be established, and the establishment of the PC5-U or data channel may be delayed until the trigger to change the state. Information between the WTRU V2X/PC5 layer and Access Stratum may be exchanged during the link establishment for the AS layer to provide (e.g., only provide) resources for the PC5-S channel.

If the WTRU (e.g., WTRU 102a) has some data (possibly a small amount of data) to be sent, the PC5-S channel may be used by the WTRU 102a to exchange the data with the peer WTRU (e.g., WTRU 102b). The WTRU (e.g., WTRU 102a) may use a low rate PC5 AMBR (e.g., received in the V2P configuration information) to limit/reduce the data rate (e.g. over PC5-S channel) for transmission in this dormant link state. The WTRU (e.g., WTRU 102a) may send an indication to the RAN 104 that the current PC5 state of the WTRU 102a is 'dormant' or limited. The RAN 104 may use this information for resource allocation for the WTRU 102a in this state.

A privacy timer may be used to update the link identifier may be ignored by the WTRU (e.g., WTRU 102a). For example, the Link Identifier Update procedure may not be executed. The WTRU (e.g., WTRU 102a) may ignore the trigger from the upper layer (application) to update the link identifiers (L2 ID, application ID, IP address/prefix, etc.).

If the unicast link is not used/needed anymore, the WTRU (e.g., WTRU 102a) may implicitly tear down the PC5 unicast link, the WTRU (e.g., WTRU 102a) may indicate the link tear down in the next keep alive message it sends to the peer WTRU (e.g., WTRU 102b) or the WTRU 102a may send a link release request without waiting for a response from the peer WTRU 102b.

A WTRU (e.g., WTRU 102a) may request to delay the security establishment during the PC5 link establishment procedure. In this case, pre-configured security credentials may be used (e.g., one or more certificates and/or one or more security keys). An indication to skip the security procedure may be sent by the requesting WTRU (e.g., WTRU 102a) on the DCR message or by the responding WTRU (e.g., WTRU 102b) on the DCA message with such an indication and skipping the security procedure.

The IP address assignment or Dynamic Host Configuration Protocol (DHCP) procedure following link establishment may be delayed until the WTRU comes back to (e.g., reenters) normal PC5 state.

The WTRU (e.g., WTRU 102a) may limit/reduce its number of PC5 connections as indicated in the profile/profile information. For example, inactive PC5 links may be released or if multiple PC5 links with are with different peers and for the same application ID, some of the multiple PC5 links may be released.

Figure 4:
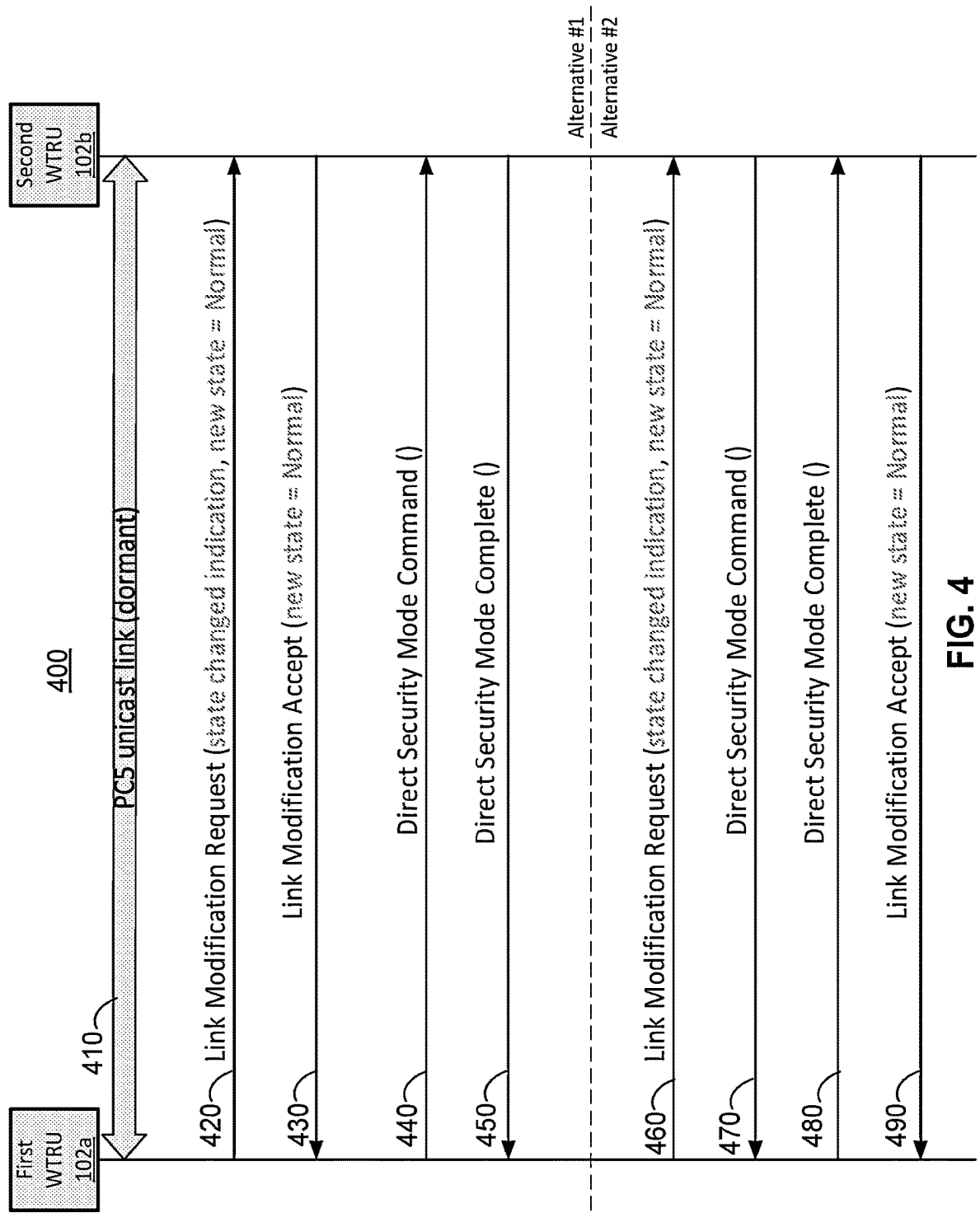
FIG. 4 illustrates a security procedure when the normal link state is entered.

FIG. 4 illustrates a security procedure when the normal link state is entered. In the case where the state transitions from "dormant/limited" to "normal" and the security procedure and/or IP address assignment procedure for this PC5 link was skipped at link establishment then, the security procedure and/or IP address/prefix assignment procedure is triggered at this point, e.g. it is triggered following the Link Modification procedure, a first embodiment, or during the Link Modification procedure, a second embodiment.

Security parameters sent on the initial Direct Communication Request message may be saved on the T-WTRU/S-WTRU (T-UE/S-UE) and re-used in the first embodiment to establish the security context. Otherwise, security parameters may be sent on the Link Modification Request message for the second embodiment.

Referring to FIG. 4, the security procedure 400 may include, at 410, the WTRUs (e.g., WTRU 102a) and WTRU 102b having established a PC5 unicast link in a dormant link state. At 420, in a first alternative, the WTRU 102a may send, to the WTRU 102b, a request (e.g., a Link Modification Request or another type of request) to the WTRU 102b. The request may include information indicating a changed state (e.g., may include a state change indication and/or may include the new state (e.g., indicating the new state as 'normal')). At 430, the WTRU 102b may send, to the WTRU 102a, an accept message (e.g., a Link Modification Accept message). The accept message may include information indicating the new accepted state (e.g., 'normal'). At 440, the WTRU 102a may send, to the WTRU 102b, a command message (e.g., a Direct Security Mode Command message). At 450, the WTRU 102b may send, to the WTRU 102a, a complete message (e.g., a Direct Security Mode Complete message. In a second alternative, at 460, the WTRU 102a may send, to the WTRU 102b, the request (e.g., the Link Modification Request or another type of request) to the WTRU 102b. The request may include information indicating a changed state (e.g., may include a state change indication and/or may include the new state (e.g., indicating the new state as 'normal"). At 470, the WTRU 102b may send, to the WTRU 102a, the command message (e.g., the Direct Security Mode Command message). At 480, the WTRU 102b may send, to the WTRU 102a, a complete message (e.g., a Direct Security Mode Complete message). At 490, the WTRU 102b may send, to the WTRU 102a, an accept message (e.g., the Link Modification Accept message). The accept message may include information indicating the new accepted state (e.g., 'normal').

The security procedure 400 may enable transitioning between the states (e.g., dormant link state and normal link state). Based on the information received from the application layer and the corresponding configuration information, the WTRU (e.g., WTRU 102a) may change the PC5 link state (either from dormant to normal PC5 or vice versa). A user moving outdoors on the street from an indoor building, as an example, may be a trigger for the WTRU (e.g., WTRU 102a) to change a dormant/limited PC5 link to an active (e.g., full) PC5 link. A converse example (moving indoors from outdoors) may trigger an active (e.g., full) PC5 link to enter the dormant/limited/inactive state.

A state change timer (e.g., inactivity timer received in V2P configuration information) may trigger state change from a normal PC5 state to a dormant/limited/inactive PC5 state. The inactivity timer may start when the WTRU (e.g., WTRU 102a) receives the user plane packet on the PC5 channel/link and may reset when a new packet is received. Upon expiry of the inactivity timer, the WTRU (e.g., WTRU 102a) may transition the link from the normal PC5 link to dormant PC5 link by initiating the link modification procedure.

The battery level may also trigger a change to the link state. For example, going from Half to Low state may trigger the WTRU (e.g., WTRU 102a) to change an active PC5 link to a dormant/limited PC5 link. A full charge of the WTRU battery may also occur. In this case, the battery state may change from Low to Half to Full, triggering the WTRU (e.g., WTRU 102a) to change a dormant/limited PC5 link to an active PC5 link.

In certain representative embodiments, the WTRU (e.g., WTRU 102a) may use the Link Modification procedure or a similar PC5-S message to indicate the change in state to the peer WTRU (e.g., WTRU 102b). New information may be added e.g. to the Link Modification Request message to inform the peer WTRU (e.g., WTRU 102b) about the change of state (e.g., a state change indication) and/or the WTRU (e.g., WTRU 102a) may include the new state in the Link Modification Request message to the peer (new link state=dormant/limited or normal). The peer WTRU (e.g., WTRU 102b) may consequently acknowledge the new state and as a result changes its state for the PC5 link. The peer WTRU (e.g., WTRU 102b) may then send a PC5 message (e.g. Link Modification Accept) to indicate its new state to the other WTRU 102a. In case the peer WTRU (e.g., WTRU 102b) cannot change the link state, the WTRU 102b may send back a Link Modification Reject message with a cause value indicating a reason to reject the request and may include the current state (which is unchanged, e.g., a dormant/limited link state). Both WTRU 102a and WTRU 102b may send information to the Access Stratum accordingly for the AS layer to adapt the resources provided for the PC5-S channel/link and potentially the PC5-U channel/link if the modification is accepted by the peer WTRU (e.g., WTRU 102b). The WTRU (e.g., WTRU 102a) behavior may correspond to the new state as previously described (either active/normal link state or dormant/limited link state) then may ensue.

Figure 5:
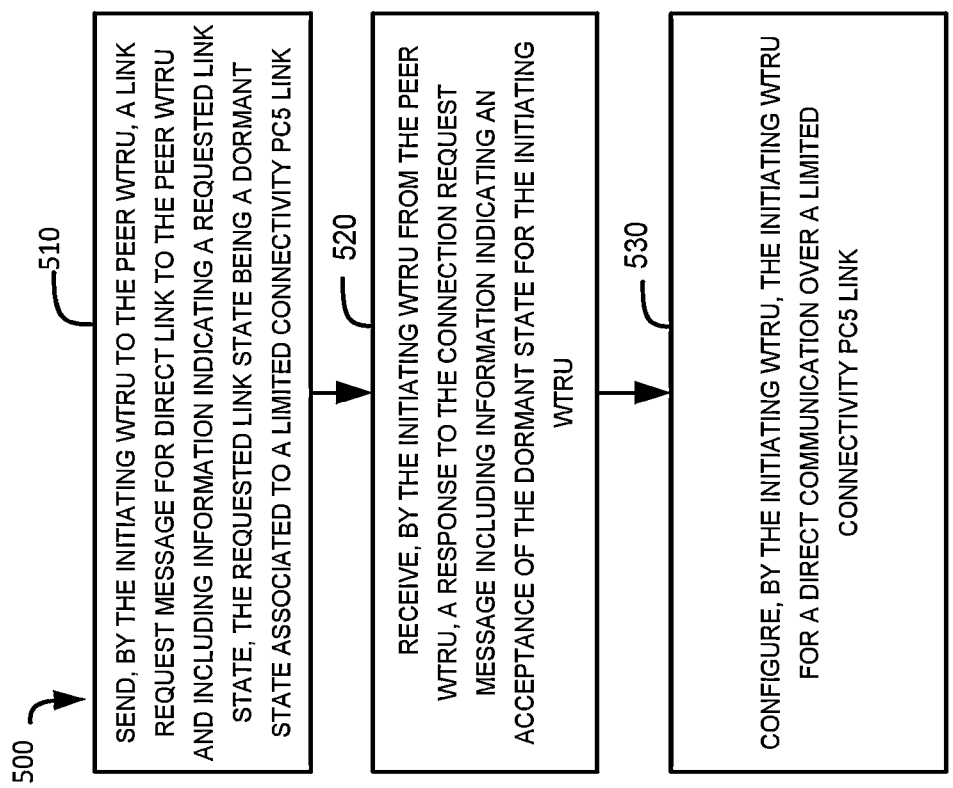
FIG. 5 is a flowchart illustrating a representative method implemented by an initiating wireless WTRU for direct link with a peer WTRU.

FIG. 5 is a flowchart illustrating a representative method implemented by an initiating WTRU for direct link with a peer WTRU using a first key identifier (e.g., for unicast communications by the WTRU with the other WTRU).

Referring to FIG. 5, the representative method 500 may include, at block 510, sending, by the initiating WTRU 102a to the peer WTRU 102b, a link request message for direct link to the peer WTRU 102b and including information indicating a requested link state, the requested link state being a dormant state associated to a limited connectivity PC5 link. At block 520, the initiating WTRU 102a may receive from the peer WTRU 102b, a response to the connection request message including information indicating an acceptance of the dormant state for the initiating WTRU 102a. At block 530, the initiating WTRU 102a may configure the initiating WTRU 102a for a direct communication over a limited connectivity PC5 link.

In certain representative embodiments, the link request message may be a Direct Communication Request (DCR) message, and the response to the link request message may be a Direct Communication Accept (DCA) message.

In certain representative embodiments, the limited connectivity PC5 link may use only control plane (C-plane) resources.

In certain representative embodiments, the initiating WTRU 102a may send to a network entity information indicating that the direct communication with the peer WTRU 102b is over the limited connectivity PC5 link.

In certain representative embodiments, the direct communication over PC5 link may be for Vehicle-to-Pedestrian (V2P) communication.

In certain representative embodiments, the initiating WTRU 102a may be a Pedestrian WTRU.

FIG. 6 is a flowchart illustrating a further representative method implemented by an initiating WTRU for direct link with a peer WTRU using a first key identifier (e.g., for unicast communications by the WTRU with the other WTRU).

Referring to FIG. 6, the representative method 600 may include, at block 610, establishing, by the initiating WTRU 102a based on profile information, a direct link of a first link state with the peer WTRU 102b. The first link state may be a dormant link state associated to a limited connectivity PC5 link and a second link state may be a normal link state associated to a full connectivity PC5 link. At block 620, the initiating WTRU 102a may receive, by a lower layer of the initiating WTRU 102a from an application layer, a trigger. At block 630, the initiating WTRU 102a may modify the link state associated with the direct link to a normal link state.

In certain representative embodiments, the initiating WTRU 102a may send to the peer WTRU 102, a link modification request message including information indicating a modified link state.

In certain representative embodiments, the establishment of the direct link of the first link state may include sending, by the initiating WTRU 102a to the peer WTRU 102b, a link request message including information indicating the first link state; and may include receiving, by the initiating WTRU 102a from the peer WTRU 102b, a response to the link request message including information indicating an acceptance of the first link state.

In certain representative embodiments, the limited connectivity PC5 link may include a connection/link that uses only control plane (C-plane) resources, and the full connectivity PC5 link may include a connection/link that uses both user plane (U-plane) and C-plane resources.

In certain representative embodiments, the initiating WTRU 102a may be configured such that a Quality of Service (QOS) level associated with the limited connectivity PC5 link is lower than a QoS level associated with the full connectivity PC5 link.

In certain representative embodiments, the initiating WTRU 102a may be configured such that a frequency of keep alive messages over the limited connectivity PC5 link is lower than a frequency of the keep alive messages over the full connectivity PC5 link.

In certain representative embodiments, on condition that the direct link is associated with a dormant link state, the WTRU 102a may wait until the direct link is associated with a normal link state to perform a security establishment procedure.

In certain representative embodiments, the WTRU 102a may trigger a security establishment procedure when modifying the link state associated to the direct link to the normal link state.

In certain representative embodiments, the initiating WTRU 102a may send to a network entity (e.g., RAN 104 or a gNB 180), information indicating that the direct link is associated to the first link state.

In certain representative embodiments, the direct link over PC5 may be for Vehicle-to-Pedestrian (V2P) communication.

In certain representative embodiments, the initiating WTRU 102a may be a Pedestrian WTRU.

In certain representative embodiments, the profile information may indicate any of: (1) a battery level of the initiating WTRU 102a; or (2) a maximum of PC5 link to be established by the initiating WTRU 102a.

In certain representative embodiments, the trigger may be based on any of: (1) a location of the initiating WTRU 102a; (2) a battery level of the initiating WTRU 102a; (3) a battery level of the peer WTRU 102b; (4) a determination whether the initiating WTRU 102a is indoor or outdoor; (5) a current state of an application executing on the initiating WTRU 102a.

FIG. 7 is a flowchart illustrating a further representative method implemented by an initiating WTRU for direct link with a peer WTRU using a first key identifier (e.g., for unicast communications by the WTRU with the other WTRU).

Referring to FIG. 7, the representative method 700 may include, at block 710, establishing, by the initiating WTRU 102a based on profile information, a direct link of a first link state with the peer WTRU 102b, the first link state may be a normal link state associated to a full connectivity PC5 link and a second link state may be a dormant link state associated to a limited connectivity PC5 link. At block 720, the initiating WTRU 102a may receive, by a lower layer of the initiating WTRU 102a from an application layer, a trigger. At block 730, the initiating WTRU 102a may modify the link state associated with the direct link to a dormant link state.

In certain representative embodiments, the initiating WTRU 102a may send to the peer WTRU 102b, a link modification request message including information indicating a modified link state.

In certain representative embodiments, the establishment of the direct link of the first link state may include sending, by the initiating WTRU 102a to the peer WTRU 102b, a link request message including information indicating the first link state; and receiving, by the initiating WTRU 102a from the peer WTRU 102b, a response to the link request message including information indicating an acceptance of the first link state.

In certain representative embodiments, the limited connectivity PC5 link may include a link that uses only control plane (C-plane) resources, and the full connectivity PC5 link may include a connection that uses both user plane (U-plane) and C-plane resources.

In certain representative embodiments, the initiating WTRU 102a may be configured such that a Quality of Service (QOS) level associated with the limited connectivity PC5 link is lower than a QoS level associated with the full connectivity PC5 link.

In certain representative embodiments, the initiating WTRU 102a may be configured such that a frequency of keep alive messages over the limited connectivity PC5 link is lower than a frequency of the keep alive messages over the full connectivity PC5 link.

In certain representative embodiments, the initiating WTRU 102a may send to a network entity (e.g., RAN 104 and/or gNB 180), information indicating that the direct link is associated to the first link state.

In certain representative embodiments, the direct link over PC5 may be for Vehicle-to-Pedestrian (V2P) communication.

In certain representative embodiments, the initiating WTRU 102a may be a Pedestrian WTRU.

In certain representative embodiments, the profile information may indicate any of: (1) a battery level of the initiating WTRU 102a; or (2) a maximum of PC5 link to be established by the initiating WTRU 102a.

In certain representative embodiments, the trigger may be based on any of: (1) a location of the initiating WTRU 102a; (2) a battery level of the initiating WTRU 102a; (3) a battery level of the peer WTRU 102b; (4) a determination whether the initiating WTRU 102a is indoor or outdoor; (5) a current state of an application executing on the initiating WTRU 102a.

Figure 8:
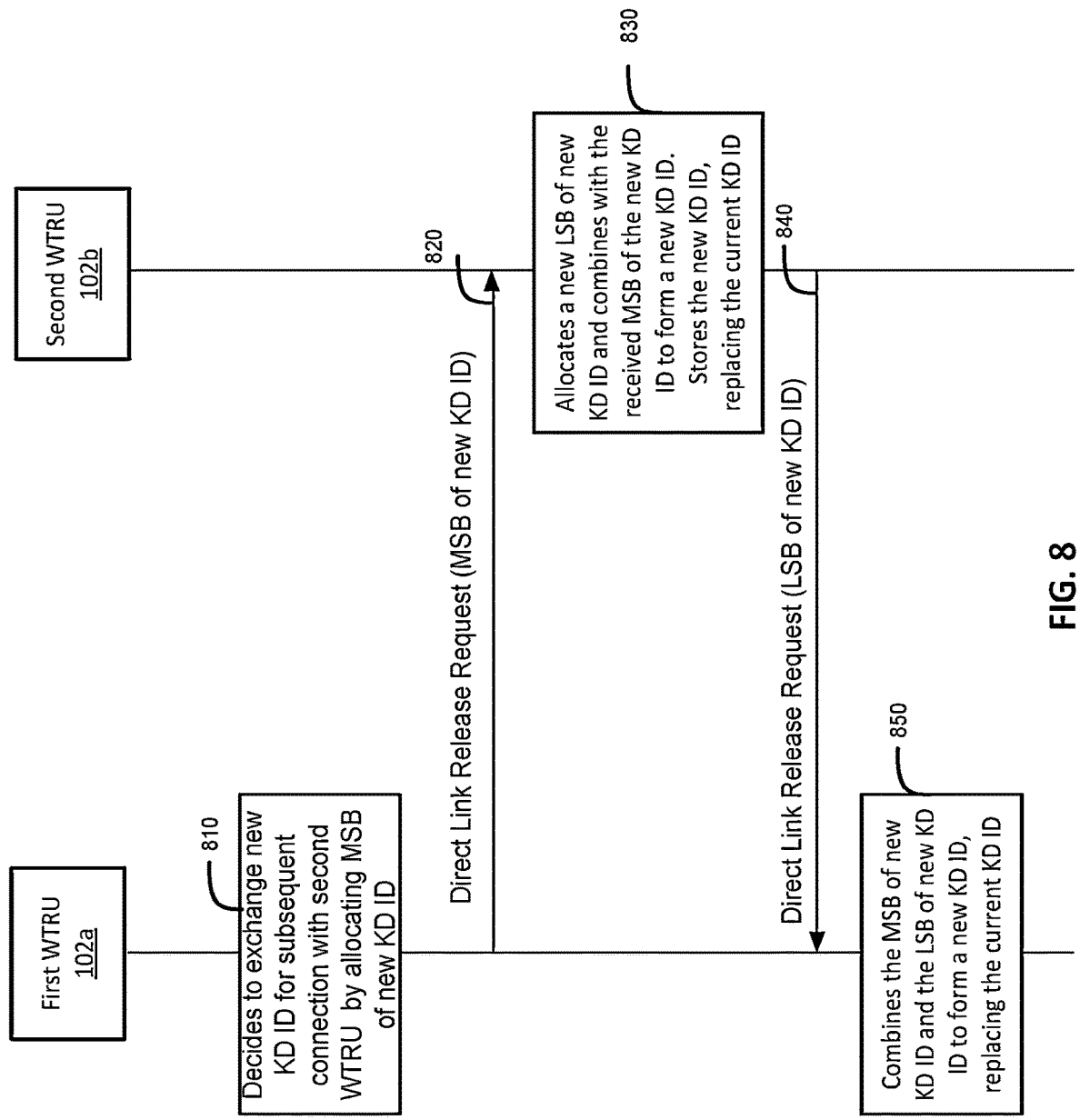
FIG. 8 is a diagram illustrating a security procedure implemented by an initiating wireless WTRU for direct link with a peer WTRU.

FIG. 8 is a diagram illustrating a security procedure implemented by an initiating WTRU for direct link with a peer WTRU.

Referring to FIG. 8, privacy of Root Key identifier (KD ID) is included. The peer WTRUs 102 may establish a new root key identifier (KD ID) during a Direct Link Release procedure. Either WTRU may use the new KD ID when reconnecting with the peer WTRU by including the new KD ID in a DCR message. The Link Release Request/Response message may be integrity, confidentiality and replay protected.

At block 810, the initiating WTRU 102a may decide/determine to exchange a new KD ID for a subsequent connection with the peer WTRU 102b by allocating a new Most Significant Byte (MSB) of the new KD ID. At block 820, the initiating WTRU (e.g., WTRU 102a) may inform the peer WTRU (e.g., WTRU 102b) that it wishes to update the current KD ID shared with the peer WTRU (e.g., WTRU 102b), by sending a Direct Link Release Request message that may include the MSB of the new KD ID.

At block 830, the peer WTRU 102b may allocate new Least Significant Byte (LSB) of the new KD ID and may combine the LSB of the new KD ID with the received MSB of the new KD ID to form a new KD ID. The peer WTRU 102b may store the new KD ID by replacing the current KD ID. At block 840, the initiating WTRU (e.g., WTRU 102a) may receive from the peer WTRU (e.g., WTRU 102b) a Direct Link Release Response message that may include the Least Significant Byte of the new KD ID. At block 850, the initiating WTRU (e.g., WTRU 102a) may combine the MSB of the new KD ID and the received LSB of the new KD ID to form a new KD ID and may store the new KD ID, replacing the current KD ID.

The peer WTRU (e.g., WTRU 102b) may receive from the initiating WTRU (e.g., WTRU 102a) a Direct Link Release Request message that includes the MSB of the new KD ID. The peer WTRU (e.g., WTRU 102b) may allocate a LSB of the new KD ID and may combine it with the received MSB of the new KD ID to form the new KD ID. The peer WTRU (e.g., WTRU 102b) may store the new KD ID, replacing the current KD ID. The peer WTRU (e.g., WTRU 102b) may send to the initiating WTRU (e.g., WTRU 102a) a Direct Link Release Response message that includes a LSB of the new KD ID.

Alternatively, the peer WTRUs 102b may establish a new KD ID during a (subsequent) Link Establishment procedure. Either WTRU 102a or 102b may use the new KD ID when reconnecting with its peer WTRU 102b or 102a by including the new KD ID in a DCR message. The Direct Security Mode Command (DSMC) Complete and Direct Communication Accept (DCA) messages used to exchange KD ID are integrity, confidentiality and replay protected.

The initiating WTRU 102a may inform the peer WTRU 102b that it wishes/is to update the identifier of the current KD ID shared with the peer WTRU 102b by sending a Direct Security Mode Command Complete that includes the MSB of the new KD ID. The initiating WTRU 102a may receive from the peer WTRU 102b a Direct Communication Accept message that includes the LSB of the new KD ID. The initiating WTRU 102a may combine the MSB of the new KD ID and the LSB of the new KD ID to form a new KD ID and store the new KD ID, replacing the current KD ID.

The peer WTRU 102b may receive from the initiating WTRU 102a a Direct Security Mode Command Complete message that includes the MSB of the new KD ID. The peer WTRU 102b may allocate a LSB of the new KD ID and may combine it with the received MSB of the new KD ID to form the new KD ID. The peer WTRU 102b may store the new KD ID, replacing the current KD ID. The peer WTRU 102b may send to the initiating WTRU 102a a Direct Communication Accept message that includes the LSB of the new KD ID.

FIG. 9 is a flowchart illustrating a representative method implemented by an initiating wireless WTRU for direct link with a peer WTRU using a first key identifier of a root key (e.g., for unicast communications by the WTRU with the other WTRU).

Referring to FIG. 9, the representative method 900 may include, at block 910, sending, by the initiating WTRU 102a to the peer WTRU, a release request message to release the direct link with the peer WTRU 102b. The release request message may include information indicating first security information associated with a second key identifier of the root key. At block 920, the initiating WTRU 102a may receive from the peer WTRU 102b, a response to the release request message including second security information associated with the second key identifier of the root key. At block 930, the initiating WTRU 102a may determine the second key identifier of the root key using the first security information and the second security information. At block 940, the initiating WTRU 102a may send to the peer WTRU 102b, a message including information indicating the second key identifier of the root key.

In certain representative embodiments, the root key identified by the second key identifier is used to provide security protection for a direct communication of the initiating WTRU 102a with the peer WTRU 102b via a new direct link.

In certain representative embodiments, the first security information includes a first portion of the second key identifier of the root key and the second security information includes a second portion of the second key identifier of the root key.

In certain representative embodiments, the first portion includes a set of most significant bits (MSB) of the second key identifier of the root key and the second portion includes a set of least significant bits (LSB) of the second key identifier of the root key.

In certain representative embodiments, the first portion includes a set of LSB of the second key identifier of the root key and the second portion includes a set of MSB of the second key identifier of the root key.

In certain representative embodiments, the message including information indicating the second key identifier of the root key may be sent in cleartext/clear.

In certain representative embodiments, the release request message and the response to the release request message may be security protected using the root key identified by the first key identifier.

In certain representative embodiments, the security protection applied to the release request message comprises any of: integrity protection or confidentiality protection; and the security protection applied to the response to the release request message comprises any of: integrity protection or confidentiality protection.

In certain representative embodiments, the initiating WTRU 102a may establish a direct communication using a secure layer-2 link over PC5.

In certain representative embodiments, the release request message may be a Direct Link Release (DLR) Request message, and the response to the release request message may be a DLR Response message.

In certain representative embodiments, the direct communication may be for Vehicle-to-Pedestrian (V2P) communication.

In certain representative embodiments, the initiating WTRU 102a may be a Pedestrian WTRU.

In certain representative embodiments, the initiating WTRU 102a may store the second key identifier by replacing the first key identifier.

FIG. 10 is a flowchart illustrating another representative method implemented by an peer wireless WTRU for direct link with a initiating WTRU using a first key identifier of a root key (e.g., for unicast communications by a WTRU with another WTRU).

Referring to FIG. 10, the representative method 1000 may include, at block 1010, receiving, by the peer WTRU 102b from the initiating WTRU 102a, a release request message to release the direct link with the peer WTRU 102b. The release request message may include information indicating first security information associated with a second key identifier of the root key. At block 1020, the peer WTRU 102b may send to the initiating WTRU 102a, a response to the release request message including second security information associated with the second key identifier of the root key. At block 1030, the peer WTRU 102b may determine the second key identifier of the root key using the first security information and the second security information. At block

1040, the peer WTRU 102*b* may receive from the initiating WTRU 102*a*, a message including information indicating the second key identifier of the root key.

In certain representative embodiments, the root key identified by the second key identifier is used to provide security protection for a direct communication of the initiating WTRU 102*a* with the peer WTRU 102*b* via a new direct link or a direct relink.

In certain representative embodiments, the first security information includes a first portion of the second key identifier of the root key and the second security information includes a second portion of the second key identifier of the root key.

In certain representative embodiments, the first portion includes a set of most significant bits (MSB) of the second key identifier of the root key and the second portion includes a set of least significant bits (LSB) of the second key identifier of the root key.

In certain representative embodiments, the first portion includes a set of LSB of the second key identifier of the root key and the second portion includes a set of MSB of the second key identifier of the root key.

In certain representative embodiments, the message including information indicating the second key identifier of the root key may be sent in cleartext/clear.

In certain representative embodiments, the release request message and the response to the release request message may be security protected using the root key identified by the first key identifier.

In certain representative embodiments, the security protection applied to the release request message comprises any of: integrity protection or confidentiality protection; and the security protection applied to the response to the release request message comprises any of: integrity protection or confidentiality protection.

In certain representative embodiments, the peer WTRU 102*b* may establish a direct communication using a secure layer-2 link over PC5.

In certain representative embodiments, the release request message may be a Direct Link Release (DLR) Request message, and the response to the release request message may be a DLR Response message.

In certain representative embodiments, the direct communication may be for Vehicle-to-Pedestrian (V2P) communication.

In certain representative embodiments, the peer WTRU 102*b* may be a Pedestrian WTRU.

In certain representative embodiments, the peer WTRU 102*b* may store the second key identifier by replacing the first key identifier.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mate-able and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speaker-phone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable storage medium as instructions for execution by a computer or processor to perform the actions described hereinabove. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by an initiating wireless transmit/receive unit (WTRU) for direct link with a peer WTRU using a first key identifier of a root key, the method comprising:
sending, to the peer WTRU, a release request message to release the direct link with the peer WTRU, the release request message including first information indicating a first portion of a second key identifier of the root key, wherein the first portion includes a set of most significant bits of the second key identifier of the root key;
receiving, from the peer WTRU, a response message to the release request message including second information indicating a second portion of the second key identifier of the root key, wherein the second portion includes a set of least significant bits of the second key identifier of the root key;
determining the second key identifier of the root key based on the set of the most significant bits and the set of the least significant bits;
storing the second key identifier of the root key by replacing the first key identifier of the root key; and
sending, to the peer WTRU, during a link establishment request with the peer WTRU, a message including third information indicating the second key identifier of the root key.

2. The method according to claim 1, wherein the root key identified by the second key identifier is used to provide security protection for a direct communication of the initiating WTRU with the peer WTRU via a new direct link.

3. The method according to claim 1, wherein the release request message and the response message are security protected; and wherein the security protection applied to the release request message comprises any of: integrity protection or confidentiality protection; and/or the security protection applied to the response message comprises any of: integrity protection or confidentiality protection.

4. The method according to claim 1, further comprising establishing a direct communication via a PC5 link.

5. The method according to claim 4, further comprising establishing the direct communication using a secure layer-2 link.

6. The method according to claim 1, wherein the release request message is a direct link release request message.

7. The method according to claim 1, wherein the response message to the release request message is a direct link release response message.

8. The method according to claim 1, wherein the message including the third information indicating the second key identifier of the root key is a direct communication request message.

9. An initiating Wireless Transmit/Receive Unit (WTRU) configured for direct link with a peer WTRU using a first key identifier of a root key, the initiating WTRU comprising:
a transmitter/receiver unit configured to:
send, to the peer WTRU, a release request message to release the direct link with the peer WTRU, the release request message including first information indicating a first portion of a second key identifier of the root key, wherein the first portion includes a set of most significant bits of the second key identifier of the root key;
receive, from the peer WTRU, a response message to the release request message including second information indicating a second portion of the second key identifier of the root key, wherein the second portion includes a set of least significant bits of the second key identifier of the root key;
a processor configured to determine the second key identifier of the root key based on the set of the most significant bits and the set of the least significant bits;
store the second key identifier of the root key by replacing the first key identifier of the root key; and
wherein the transmitter/receiver unit is configured to send, to the peer WTRU, during a link establishment request with the peer WTRU, a message including third information indicating the second key identifier of the root key.

10. The initiating WTRU according to claim 9, wherein the root key identified by the second key identifier is used to provide security protection for a direct communication of the initiating WTRU with the peer WTRU via a new direct link.

11. The initiating WTRU according to claim 9, wherein the release request message and the response message are security protected; and wherein the security protection applied to the release request message comprises any of: integrity protection or confidentiality protection; and/or the security protection applied to the response message comprises any of: integrity protection or confidentiality protection.

12. The initiating WTRU according to claim 9, wherein the transmitter/receiver unit is configured to establish a direct communication via a PC5 link.

13. The initiating WTRU according to claim 12, wherein the transmitter/receiver unit is configured to establish the direct communication using a secure layer-2 link.

14. The initiating WTRU according to claim 9, wherein the release request message is a direct link release request message.

15. The initiating WTRU according to claim 9, wherein the response message to the release request message is a direct link release response message.

16. The initiating WTRU according to claim 9, wherein the message including third information indicating the second key identifier of the root key is a direct communication request message.

* * * * *